United States Patent [19]

Camboulives et al.

[11] 3,873,027

[45] Mar. 25, 1975

[54] VARIABLE-GEOMETRY CONVERGENT-DIVERGENT NOZZLES

[75] Inventors: Andre Alphonse Mederic Leon Camboulives, Savigny-Sur-Orge; Theophile Francois Le Maout, Cesson; Roger Alfred Jules Vandenbroucke, Antony; Bernard Arthur Zibette, Vitry-sur-Seine, all of France

[73] Assignee: Societe Nationale d'Etude et de Construction de Moteurs d'Aviation, Paris, France

[22] Filed: Apr. 26, 1974

[21] Appl. No.: 464,452

[30] Foreign Application Priority Data

Apr. 27, 1973 France .............................. 73.15346

[52] U.S. Cl.... 239/265.33, 239/265.39, 239/265.41

[51] Int. Cl. ............................................ B64c 15/04

[58] Field of Search..... 239/265.33, 265.35, 265.37, 239/265.39, 265.43, 602, 265.41

[56] References Cited

UNITED STATES PATENTS

| | | | |
|---|---|---|---|
| 2,846,844 | 8/1958 | O'Rourke | 239/265.35 |
| 2,995,010 | 8/1961 | Arscott | 239/265.39 |
| 3,436,020 | 4/1969 | Duthion et al. | 239/265.33 |
| 3,460,763 | 8/1969 | Kopp | 239/265.43 |
| 3,537,647 | 11/1970 | Camboulives et al. | 239/265.33 |

*Primary Examiner*—Lloyd L. King
*Attorney, Agent, or Firm*—William J. Daniel

[57] ABSTRACT

A variable-geometry convergent-divergent nozzle for a jet engine includes an upstream ring of flaps and a downstream ring of flaps. Each ring comprises alternate internal and external flaps urged into sealing engagement. Each internal flap of the upstream ring is articulated to an internal flap of the downstream ring and each external flap of one of the two rings is formed with a recess in which the end of the hinge connection associated with the adjacent pair of internal flaps is slidably received.

4 Claims, 10 Drawing Figures

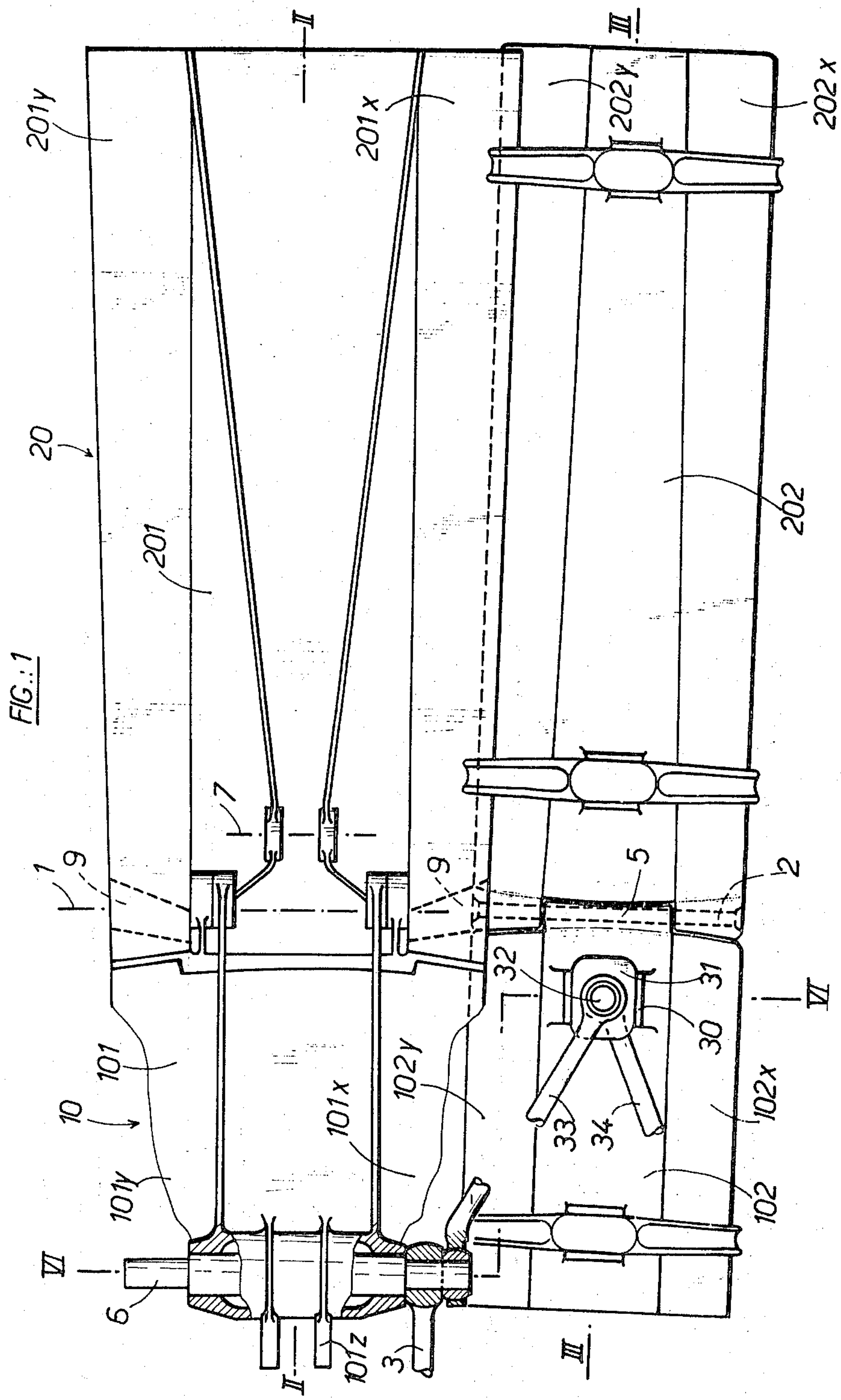
FIG.:1
20
201
201y
201x
202
202y
202x
10
101
101x
101y
101z
102
102x
102y
1
2
3
5
6
7
9
30
31
32
33
34
II
III
VI

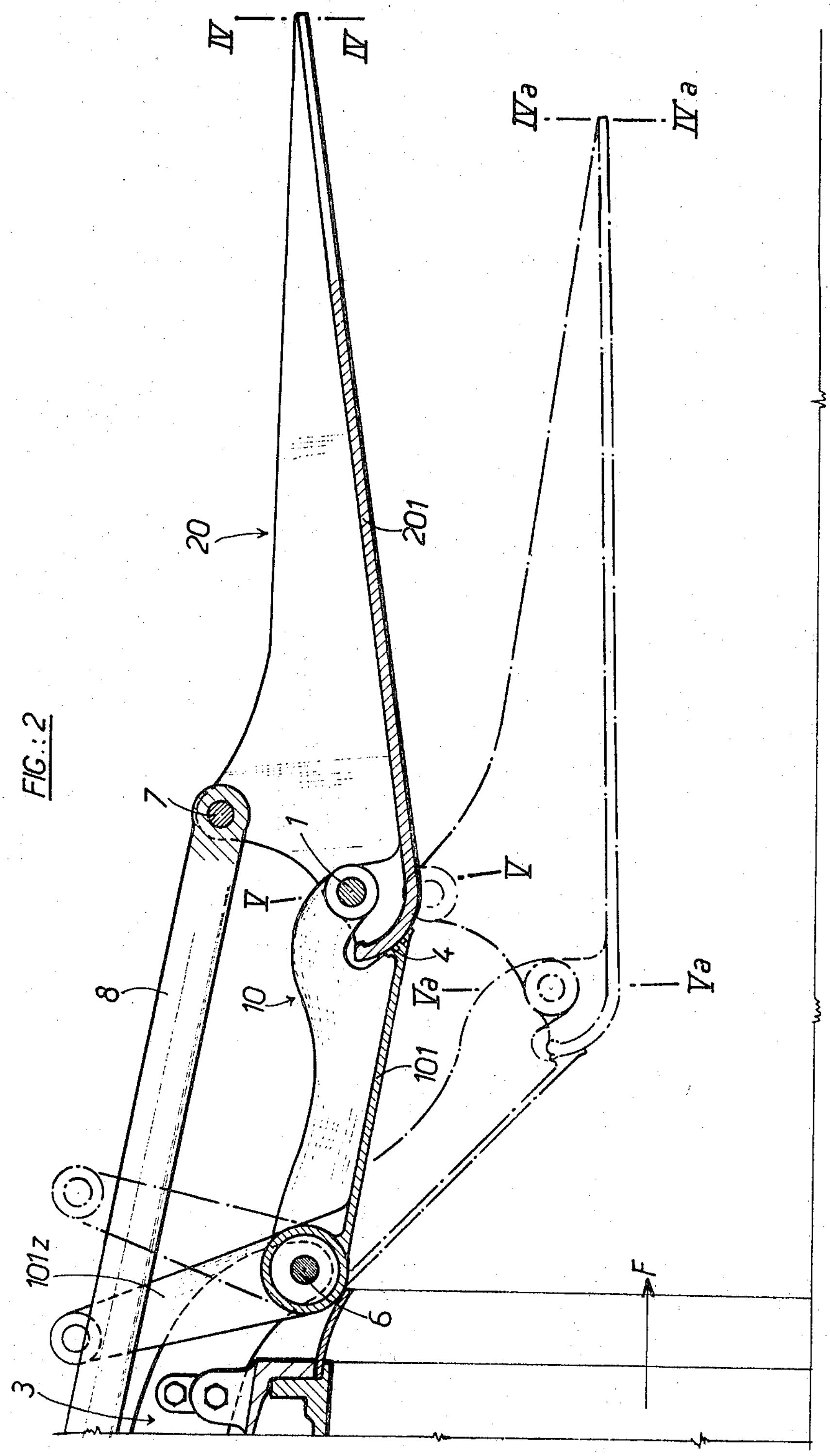
FIG.:2
IV
IV
IVa
IVa
20
201
7
1
V
V
4
Va
Va
8
10
101
101z
6
F
3

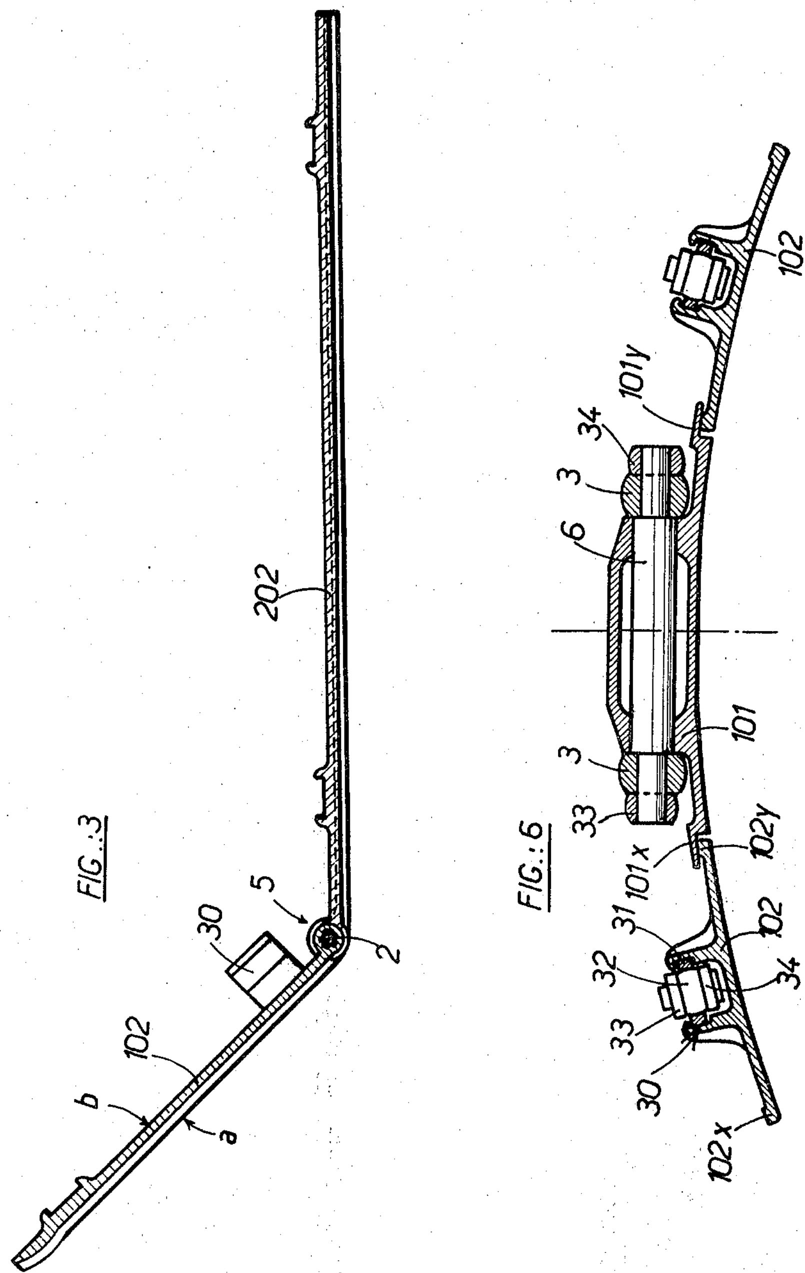
FIG.:3
202
5
30
2
102
b
a
FIG.:6
102
101y
34
3
6
3
33
101
101x
102y
31
102
32
34
33
30
102x

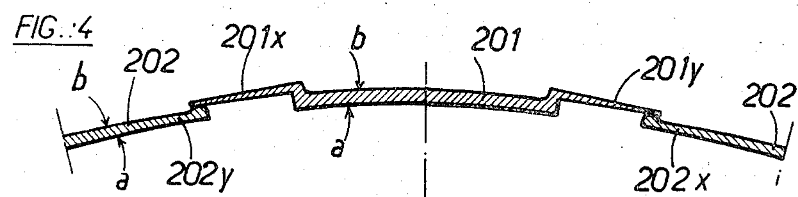
FIG.:4
202
201x
b
201
201y
202
b
a
202y
a
202x
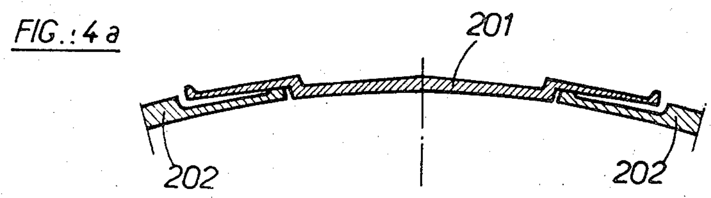
FIG.:4a
201
202
202
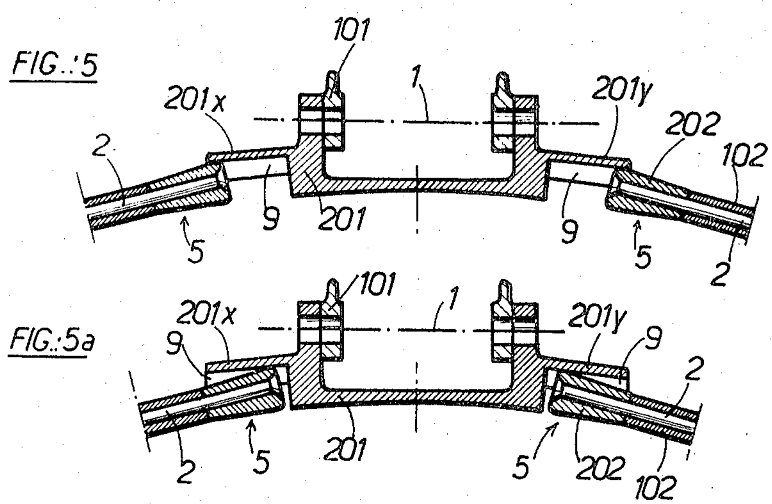
FIG.:5
101
1
201x
201y
202
102
2
9
201
9
5
5
2
FIG.:5a
101
1
201x
201y
9
9
2
2
5
201
5
202
102

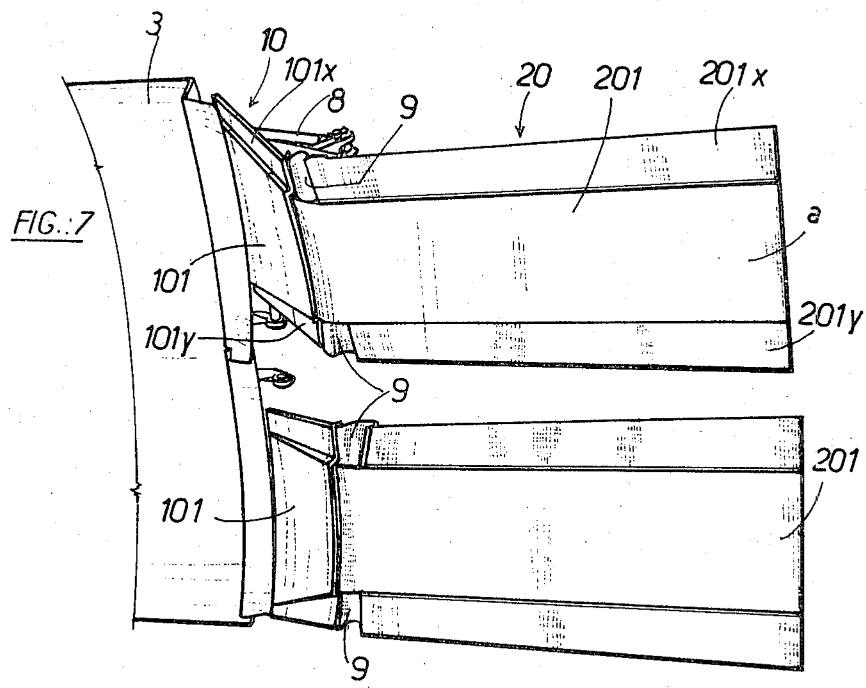
FIG.:7
3
10
101x
8
9
20
201
201x
a
101
101y
201y
9
201
101
9
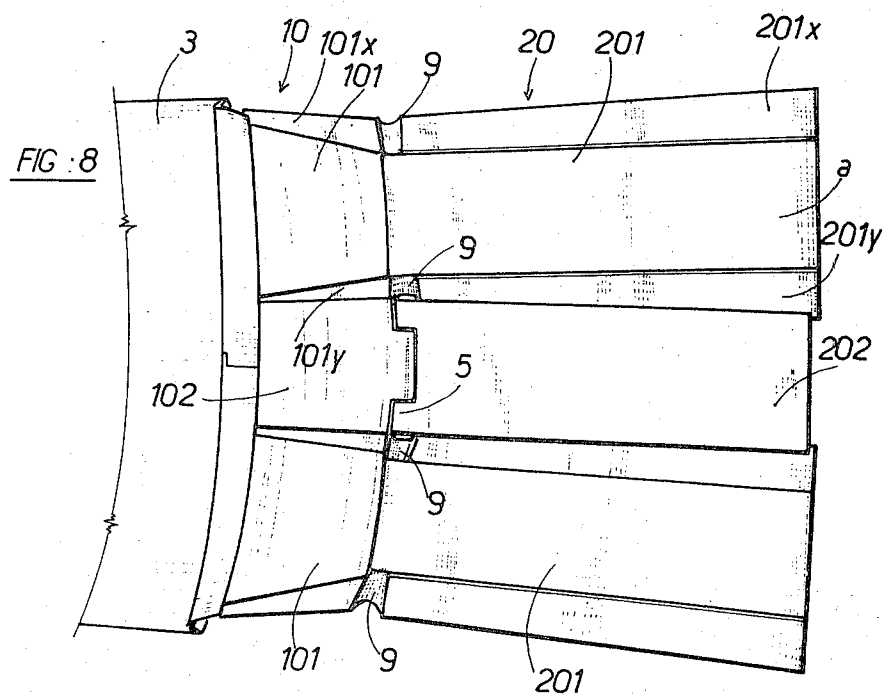
FIG :8
3
10
101x
101
9
20
201
201x
a
9
201y
101y
202
102
5
9
101
9
201

VARIABLE-GEOMETRY CONVERGENT-DIVERGENT NOZZLES

This invention relates to a variable-geometry convergent-divergent nozzle designed for the passage of a fluid flow and in particular for installation in a jet engine such as a turbo-jet engine of the kind employed to propel a flying machine such as an aircraft.

The nozzle to which the invention relates is of that kind which comprises a plurality of flaps of variable inclination, each of which has an internal face disposed towards the nozzle axis and an external face disposed towards the nozzle exterior, and also two lateral edges extending in the longitudinal direction of the nozzle, said flaps being distributed in two rings which are arranged one after the other in the direction of fluid flow, namely an upstream ring of flaps and a downstream ring of flaps, with each flap in the upstream ring being articulated at its downstream end portion to the upstream end portion of a flap in the downstream ring, each ring of flaps comprising a first group of flaps, namely external flaps, arranged alternately, considering the circumferential direction of the nozzle, with a second group of flaps, namely internal flaps, with each internal flap bearing through its external face, in the region of its two lateral edges, against the internal faces of the two adjacent external flaps.

In accordance with an arrangement which is frequently used, the external flaps are actuated, for example by means of jacks (they are then referred to as "actuated" flaps), whilst the internal flaps (which are then referred to as "follower" flaps) are applied against the external flaps by the pressure of the fluid passing through the nozzle.

One of the main difficulties encountered in the design of a variable-geometry convergent-divergent nozzle resides in providing a satisfactory seal at the junction of the various groups of flaps, i.e., upstream, downstream, external and internal flaps. In this context, a particularly difficult problem to resolve is that of achieving a lateral seal between adjacent internal and external flaps in the region of articulation between the flaps of the upstream ring and those of the downstream ring. It is here that the present invention provides a solution.

In accordance with the invention, in a variable-geometry convergent-divergent nozzle of the afore-said kind, each internal flap of the upstream ring is articulated to an internal flap of the downstream ring by means of a hinge which extends over the whole of the circumferential width of these two flaps and, in one of the two rings, each external flap is provided adjacent each of its two lateral edges with a recess shaped in such manner as to receive, in a substantially sealed manner, the end of the hinge associated with the adjacent pair of internal flaps, said end being arranged to slide in said recess in the circumferential direction of the nozzle when any variation in nozzle flap inclination takes place.

A recess is preferably formed in each external flap of the downstream ring. In accordance with another feature of the invention, applicable to the case where, in each of the two rings, one flap in every two is a actuated flap whilst the other is a follower flap, the nozzle comprises guide means carried by a fixed reference structure and cooperating in a sliding relationship with the follower flaps of the upstream rings so that whatever its inclination, each follower flap of the upstream ring remains centred in relation to the two actuated flaps surrounding it. This disposition assists the attainment of a correct sealing contact over the whole length of the lateral edges of the flaps.

The invention will now be described by way of example with reference to an embodiment of variable-geometry convergent-divergent nozzle shown in the accompanying drawings, in which:

FIG. 1 is a partial plan view of a variable-geometry convergent-divergent nozzle in accordance with the invention, showing not only an upstream external flap and a downstream external flap articulated together (actuated flaps), but also an upstream internal flap and a downstream internal flap, likewise articulated together (follower flaps).

FIG. 2 is a longitudinal sectional view, on the line II—II of FIG. 1, showing two external flaps articulated together (actuated flaps).

FIG. 3 is a longitudinal sectional view, on the line III—III of FIG. 1, showing two internal flaps (follower flaps), articulated together.

FIGS. 4, 5 and 6 are partial cross sectional views, respectively on the lines IV—IV, and V—V of FIG. 2, and VI—VI of FIG. 1, through a nozzle which is assumed to be in the open configuration.

FIGS. 4*a* and 5*a* are partial cross sectional views on the lines IV*a*—IV*a* and V*a*—V*a* of FIG. 2, through a nozzle which is assumed to be in the closed configuration.

FIG. 7 is a partial perspective view of the interior of the nozzle, the internal flaps (follower flaps) having been removed.

FIG. 8 is a view similar to that of FIG. 7, but with the internal flaps (follower flaps) having been replaced.

In the drawings, an exhaust system has been shown which is designed for the passage of a gaseous fluid flow F, said system comprising, in particular, a fixed reference structure 3 (see FIG. 2) followed by a variable-geometry convergent-divergent nozzle having an axis X'-X.

The nozzle comprises a plurality of flaps of variable inclination, each flap having two lateral edges which extend in the longitudinal direction of the nozzle. The references *a* and *b* respectively designate (see FIG. 4) the internal face (disposed towards the axis X'-X of the nozzle) and the external face (disposed towards the exterior of the nozzle) of each of the flaps.

The flaps are distributed in two rings arranged one after the other in the direction of flow of the fluid F, namely an upstream ring 10 of convergent flaps and a downstream ring 20 of divergent flaps.

Each ring 10 (20) of flaps comprises a first group of flaps 101 (201), namely external flaps, which are arranged alternately, considered in the circumferential direction of the nozzle, with a second group of flaps 102 (202), said second group of flaps being internal flaps. The references 101*x*, 201*x*, 102*x* and 202*x* and 101*y*, 201*y*, 102*y* and 202*y* designate the respective lateral edges of flaps 101, 201, 102 and 202. Each internal flap 102, 202 bears, in the region of its two lateral edges 102*x* and 102*y* or 202*x* and 202*y*, against the internal face of the two surrounding external flaps 101, 201.

Each external flap 101 of the upstream ring 10 is articulated at its downstream end portion to the upstream end portion of an external flap 201 of the downstream ring 20 for movement relative thereto about a pin 1. Sealing in the zone of articulation of these two flaps is effected by contact, along the whole circumferential width of the two flaps, between the external face of the flap 101 and the internal face of the flap 201, the fluid losses being limited by a labyrinth 4.

Each internal flap 102 of the upstream ring 10 is articulated at its downstream end portion to the upstream end portion of an internal flap 202 of the downstream ring 20, for movement relative thereto about a pin 2, the pin forming a part of a hinge 5 which extends over the full circumferential width of these two flaps. Seal between these two flaps is effected by the dovetailing into one another of the said end portion of the two flaps 102 and 202.

Each external flap 101 of the upstream ring 10 is articulated at its upstream end portion to the fixed structure 3, for movement relative thereto about a pin 6, and is fixed to a control lever 101*z* which can be operated by means of a control element such as a jack, not shown. Each external flap 201 of the downstream ring 20 is articulated, for movement relative thereto about a pin 7, to a control link 8. Control of the flaps 101 and 201 can be achieved, for example, by means of a system similar to that which has been described in U.S. Pat. application Ser. No. 351,578, filed Apr. 16, 1973, now U.S. Pat. No. 3,807,637.

In the arrangement illustrated by way of example, only the external flaps 101 (201) are actuated. The internal flaps 102 (202) are simply applied against the external flaps by the pressure of the fluid flowing through the nozzle. However, it goes without saying that this arrangement is not mandatory and other arrangements are conceivable, for example, the reverse kind of system, i.e., actuated internal flaps and external follower flaps.

Within the context thus defined, the present invention seeks to improve the lateral seal between the external flaps 101 (201) and the adjacent internal flaps 102 (202), more particularly in the region of articulation between the flaps of the upstream ring 10 and those of the downstream ring 20 of the nozzle.

To this end, in one of the two rings, for example in the downstream ring 20, each external flap 201 is provided, in the neighbourhood of each of its two lateral edges 201*x*, 201*y*, with a recess 9 designed to receive in a substantially sealed fashion, the end of the hinge 5 associated with the adjacent pair of internal flaps 102, 202. Each recess 9 takes the form of a rounded groove which, over a substantial area of contact, matches the shape of the end of said hinge.

As FIGS. 5 and 5*a* show particularly clearly, with any variations in the inclinations of the flaps of the nozzle, the end of the hinge 5 slides in the recess 9, following the circumferential direction of the nozzle whilst remaining in substantial sealing contact with the wall of said recess.

In accordance with an advantageous embodiment of the invention, guide means are provided in order to effect centring of the upstream follower flaps 102 in relation to the two surrounding actuated flaps 101, whatever the inclination of the nozzle flaps.

To this end, each follower flap 102 is provided, on its external face *b*, with a slideway 30 along which there can displace in the longitudinal direction of the nozzle a slide 31. The latter is articulated by means of a knuckle joint 32 to one of the ends of two links 33, 34 each of which is articulated at its other end to the fixed reference structure 3, for movement relative thereto about the pin 6. Thus, correct centering of the follower flaps 102 is achieved, whilst still enabling them to displace in the longitudinal direction of the nozzle in relation to the actuated flaps 101, with any variation in the inclination of said flaps. This arrangement makes it possible to improve the lateral sealing between adjacent flaps still further.

We claim:

1. In a variable-geometry convergent-divergent fluid flow nozzle comprising a plurality of variable inclination flaps each of which has an internal face disposed towards the nozzle axis and an external face disposed towards the exterior of the nozzle, and also two lateral edges extending in the longitudinal direction of the nozzle, said flaps being distributed in two rings which are arranged one after the other in the direction of fluid flow so as to afford an upstream ring of flaps and a downstream ring of flaps, with each flap of the upstream ring articulated at its downstream end portion to the upstream end portion of a flap in the downstream ring, each ring of flaps comprising a group of internal flaps and a group of external flaps, the internal and external flaps of each ring being arranged alternately as considered in the circumferential direction of the nozzle and each internal flap being arranged so that portions of the outer face thereof adjacent its lateral edges bear against the internal faces of the two adjacent external flaps, the improvement wherein:

a. each internal flap of the upstream ring is articulated to an internal flap of the downstream ring by means of a hinge which extends over the whole circumferential width of the said two flaps, and b. each external flap of one of the two rings is provided adjacent each of its two lateral edges with a recess shaped in such manner as to receive in a substantially sealed manner, the end of the hinge associated with the pair of adjacent internal flaps, said end being arranged to slide in said recess in the circumferential direction of the nozzle when any variation in nozzle flap inclination takes place.

2. A nozzle according to claim 1, which includes a fixed reference structure and wherein one flap of each adjacent pair of flaps in each of the two rings is a actuated flap, whilst the other is a follower flap, flap guide means being carried by said fixed reference structure.

3. A nozzle according to claim 2, wherein said guide means cooperate in a sliding relationship with the follower flaps of the upstream ring so that, whatever its inclination, each follower flap in the upstream ring remains centred in relation to the two adjacent actuated flaps.

4. A nozzle according to claim 1, wherein a recess is formed in each external flap of the downstream ring.

* * * * *